July 30, 1946.    A. LEYER    2,404,968
REGULATING DEVICE FOR PRESSURE FLUID CONTROLLED PRIME MOVERS
Filed March 17, 1943    2 Sheets-Sheet 1

Inventor:
Albert Leyer,
By Pierce + Scheffler,
Attorneys.

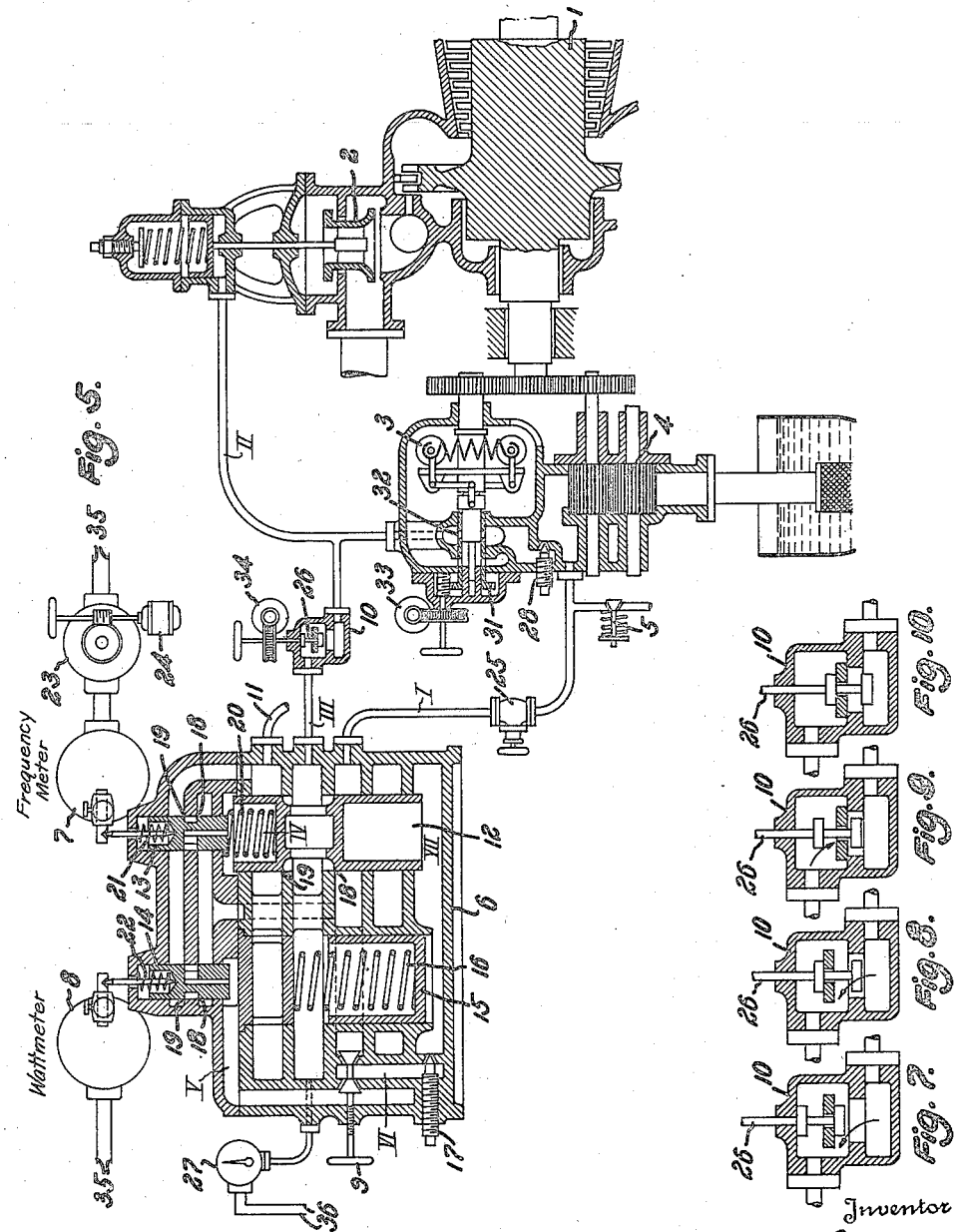

Patented July 30, 1946

2,404,968

UNITED STATES PATENT OFFICE 2,404,968

REGULATING DEVICE FOR PRESSURE FLUID CONTROLLED PRIME MOVERS

Albert Leyer, Rieden, near Baden, Switzerland, assignor to Aktiengesellschaft Brown, Boveri & Cie., Baden, Switzerland Application March 17, 1943, Serial No. 479,530
In Switzerland February 3, 1942

9 Claims. (Cl. 290—40)

Difficulties often occur in connection with the regulation of turbines operating in parallel due partly to the absence of a uniform characteristic (frequency-power curve) for the turbine governor. It has been found that a straight-line characteristic with variable inclination offers the greatest advantages for parallel operation. This, however, only applies to the characteristic for steady conditions. There is also a characteristic for temporary conditions but from this it can only be demanded that its inclination, which is a measure of the temporary degree of irregularity does not at any point fall below the value which is absolutely necessary for the stability of the regulation.

The present invention concerns a regulating device for pressure fluid controlled prime movers whose construction is based on an appreciation of the foregoing facts and where according to the invention a frequency or speed governor is combined with a device for indicating the power in such a manner that a straight-line regulating characteristic results. The power-indicating device is preferably a wattmeter in the case of turbine plants for driving electrical generators.

According to the construction of the new regulating device, subsequently briefly termed the FP-governor, the various impulses are combined without the use of a mechanical linkage by purely hydraulic means, namely in a control block which can be connected to any turbine regulating system operated by pressure oil. The manner in which this is achieved is explained by means of the constructional example illustrated in the accompanying drawings, in which Fig. 1 is a diagrammatic view of an embodiment of the invention in which the governor is combined with a standard Brown-Boveri turbine regulating system;

Fig. 5 is a fragmentary sectional view of structural elements corresponding to the parts of the Fig. 1 diagrammatic view;

Figs. 7 to 10 inclusive are sectional views illustrating different adjustments of the valve in the oil line connection between the outlet sides of the novel governor and the usual turbine governor.

Figure 1:
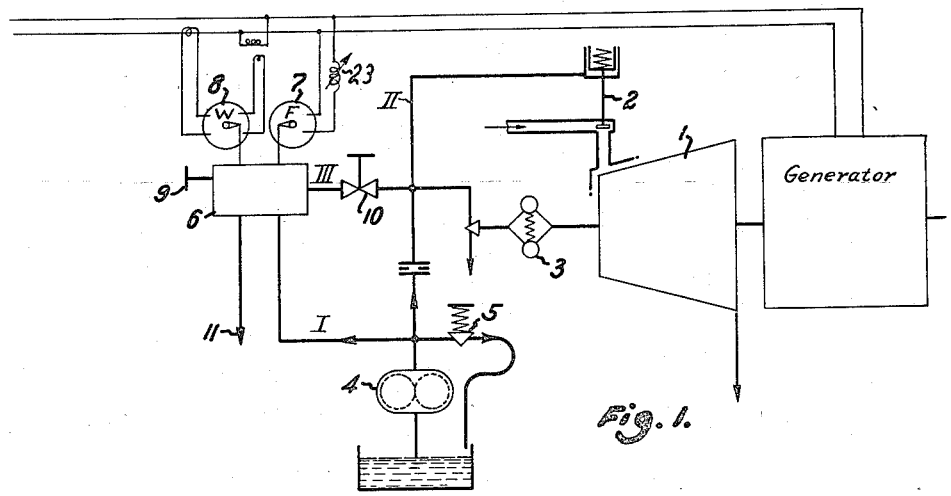

In Figure 1, the reference numeral 1 indicates a steam turbine, 2 is one of several inlet valves, 3 a governor, 4 an oil pump, 5 a pressure-holding valve, 6 the control block of the FP-governor, 7 a frequency meter, 8 a wattmeter, 9 a throttle valve, 10 a stop valve, 11 a return-flow pipe, whilst I is the pump oil system, II the normal controlling oil system and III the controlling oil system for the FP-governor. The figure shows clearly the simple and logical construction of the governor and also indicates the manner in which it operates. The electrical measuring instruments 7, 8 are connected in the usual manner to the line L from the generator G that is driven by the turbine 1, the leads to the frequency meter including an adjustable choke 23 that will be described in detail hereinafter. The operation is based on both instruments 7 and 8 passing their measuring impulses to the control block 6 which in dependence on these controls the oil system III. This system is connected over valve 10 with the controlling oil system II of the turbine governor 3 and in this way the inlet valves 2 are controlled. The turbine governor is adjusted to a somewhat higher speed and thus acts as an additional safety governor.

Figure 2:
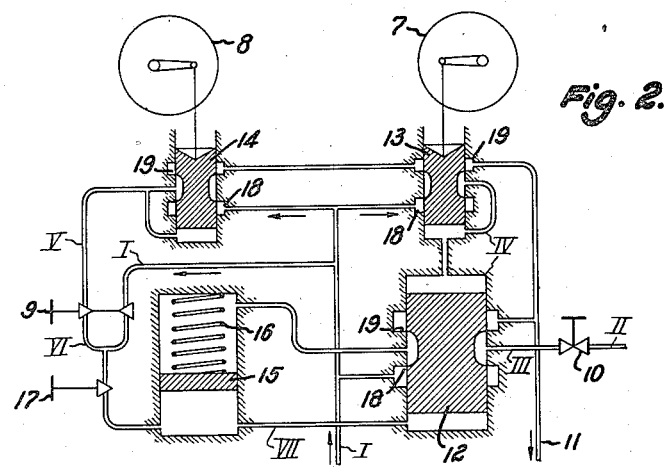
Fig. 2 is a schematic diagram of the hydraulic pressure system of the governor.

Fig. 2 shows how the pressure in system III is controlled. This figure represents a simplified section of the control block 6 and shows in addition to the details of Fig. 1 also the following elements: A main control valve 12, an auxiliary control valve 13 for the frequency meter 7, an auxiliary control valve 14 for the wattmeter 8, a return-motion piston 15 with spring 16 and a throttling screw 17. All control edges for the inflowing fluid are indicated by 18 and all outflowing control edges by 19. IV is the controlling oil system of the frequency meter 7 and V that of the wattmeter 8. VI is an intermediate oil system and VII a return-motion oil system.

System III is controlled by the main control valve 12 which by means of its control edges 18 and 19 allows pressure oil either to enter or leave the system III by moving out of the mid-position. In the steady state this is only maintained to the extent that the leakage of the valve power pistons is covered by a small supply of oil. The main control valve can move freely in its sleeve and is only maintained by the pressures in systems IV and VII. The former system IV acts in the controlling sense and the latter system VII to produce the return motion. All the elements of the governor with the exception of the main control valve serve exclusively to control either of these systems and therefore belong either to the preliminary control or return-motion of the main control valve.

The preliminary control, comprising frequency meter 7, auxiliary control valve 13 and associated pressure oil system IV, causes the openings of inlet valves 7 to vary and for this purpose moves the main control valve 12 out of its mid-position. The necessary impulses for this come from frequency meter 7 which measures the deviation of the frequency from a prescribed value. The torque developed in the meter does not in this case act as usual against a spring but is transmitted in its full magnitude by a rod to the auxiliary control valve 13 which in dependence thereon controls the system IV. This control is achieved as with the main control valve by allowing pressure oil to enter or leave over the edges 18 and 19 whereby the control valve is returned to its original position by the pressure which it controls and which for this purpose acts on the lower side of the valve. Here the pressure acts against the impulse delivered by the frequency meter and maintains it in equilibrium. The pressure is thus always proportionate to the impulse so that control valve 13 actually does nothing more than convert the deviation of the frequency from its prescribed value into a proportionate oil pressure by which the main control valve is influenced.

The return-motion, consisting of the remaining pressure oil systems and regulating elements, actuates by means of system VII the main control valve and serves the purpose of returning this latter into its mid-position after regulation has been accomplished. For this purpose system VII is connected with system III by means of the return-motion piston 15 which immediately transmits the pressure changes in system III to system VII, but at the same time enables the pressures to differ from each other due the pressure exerted by the spring 16. Having thus provided for on the one hand that the pressures of systems IV and VII are always equal after the regulating process has been completed, whilst on the other hand the pressure changes in system VII and III are the same, it must necessarily be that the main control valve 12 transmits the pressure changes system IV to system III, which amounts to the same thing as the frequency meter 7 controlling the turbine inlet valves by means of control valves 12 and 13. Frequency meter 7 thus plays the part of the inoperative turbine governor 3. A straight-line relationship between frequency and power can thus only be achieved to the extent that it already exists between controlling oil pressure II and the power. Since the conditions concerned are not permanent but only temporary there is no need to place any particular emphasis on such a connection. Nevertheless a certain degree of irregularity will occur during these operations the magnitude of which is characterised by the feature that the pressure difference in system II between no-load and full-load must also be temporarily arranged for in system IV. Such a pressure variation is, however, only possible when there is a corresponding change in frequency, which is thus identical with the temporary irregularity. Its magnitude depends actually on several factors, but it must, however, always be so selected that on the one hand it is not too large but on the other hand adequate in all cases for the necessary stability.

The means whereby the frequency and power in the steady state are arranged to form a straight line consist in a subsequent correction of the return-motion system VII to a pressure which is determined by the wattmeter 8 and is transmitted to said system from system VI by way of throttle valve 17. The wattmeter operates like the frequency meter without a spring and transmits its impulse, corresponding to the generator power, completely to the control valve 14 which converts it into a proportionate pressure in system V. This pressure together with the pump pressure in system I influences the system VI which is in communication with both pressures over the throttle valve 9. The relationship between these three pressures is illustrated graphically in Fig. 3 in which the pressures are shown on the axes indicated by I, V and VI. From the condition of continuity for system VI it can be proved that associated points such as $a$ and $b$ on the axes V and VI always lie on the same straight line $s$, from which it is to be concluded that not only the pressure V but also the pressure VI must have a linear association with the generator power. The variation range $c—d$ of system VI must then, however, always be smaller or at the most equal to variation range $e—f$ of system V. Since pressure VI after a certain interval of time also always adjusts itself in system VII, the main control valve 12 in the steady condition is maintained in equilibrium by two pressures of which one is associated with the frequency and the other with the power in a linear manner, so that these two values must necessarily also have a linear relationship and the governor characteristic will become a straight line. Both position and inclination of these lines are adjustable.

The position is influenced by the prescribed frequency by adjusting a choke coil 23 (Fig. 5) in the measuring circuit of the frequency meter 7. This operation can be compared with the speed adjustment of the turbine governor 3 and can also as in the case of the latter be performed manually or by means of a remote-controlled motor 24. The electrical conductors 35 lead to the generator.

Figure 4:
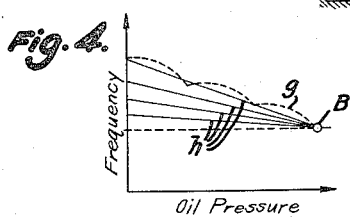
Fig. 4 is a curve sheet showing variation of the slope of the regulation characteristic with the rate of change of the load.
Figure 3:
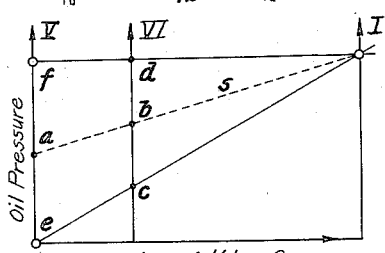
Fig. 3 is a curve sheet showing the relation between the adjustment of a throttle valve and pressures at different points in the hydraulic system.

The inclination of the characteristic depends on the power influence on the systems VI and VII. As already explained, this influence can be varied by valve 9 whereby the axis VI in Fig. 3 is moved laterally and thus the pressure variation range $c—d$ of systems VI and VII varied. The oil pressure for full-load (point $d$) remains, however, the same for all settings, so that also the frequency which must adjust this pressure in system IV is always the same as full-load (point B in Fig. 4), on condition of course that the prescribed frequency is not altered in the meantime. The adjustment of the inclination is continuous and can be undertaken during operation. The relationship between maximum and minimum inclination is 1:4. The remaining irregularity naturally varies to the same extent. Its connection with the temporary is characterised by the feature that when a rapid and total decrease in load occurs the curve $g$ and for a slow decrease one of the lines $h$ is followed. The speed at which temporary conditions change to permanent ones depends on the rapidity with which the pressure in system VI is transmitted to system VII; it can be adjusted by means of the throttle screw 17.

Fig. 5 shows further details of the FP-governor. Springs 20, 21 and 22 are new when the arrangement is compared with that shown in Fig. 2, but this does not affect the principle of the governor. These springs are merely means by which certain initial oil pressures can be obtained. In Fig. 5 the same elements as in Figs. 1 and 2 are indicated by the same reference numerals.

Figure 6:
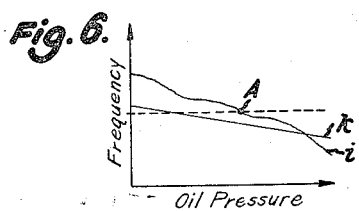
Fig. 6 is a curve sheet showing the relation between turbine speed (frequency) and the hydraulic pressures established by the novel governor and by the usual turbine governor.

In order to bring the FP-governor into operation it is assumed that there is a turbine already in operation and it is only necessary to change-over from the turbine governor 3 to the FP-governor. This operation is accomplished by connecting system III with the controlling oil system II of the turbine governor 3 and disconnecting this latter by a corresponding adjustment of its sleeve 31. Naturally this procedure must be accomplished without any unsteadiness in operation. This is then the case when the FP-governor is adjusted in such a manner that, before both oil systems are connected, it also tends towards the operating point A momentarily maintained by the turbine governor according to its characteristic $i$ (Fig. 6). The symptom for this condition is a total pressure change in system III which always occurs when the characteristic $k$ of the FP-governor is moved through A. The FP-governor is so designed that it maintains the pressure in system III at zero when $k$ is below A or at pump pressure when $k$ is above A. This change in pressure can be observed on the manometer 27 and enables as soon as it occurs valve 10 to be opened. Thereupon the turbine governor can be disconnected and the regulation is taken over completely by the FP-governor. The entire operation can be initiated either manually on the machine or by remote control from a switchboard. (Leads 36 are connected to the switchboard.) In the latter event the manometer 27 is provided with a contact which causes a lamp on the switchboard to light up when a change in pressure in system III occurs. The putting into operation of the FP-governor thus comprises the following four phases:

(1) Instruments 7 and 8 switched in and pressure oil supply opened by means of valve 25.

(2) Characteristic of FP-governor displaced until change of pressure in system III occurs.

(3) Valve 10 opened.

(4) Turbine governor put out of operation.

Fundamentally the same points have to be considered when the governor is put out of operation. In this case the turbine governor 3 must first be adjusted before system III is disconnected from system II. The correct position of the turbine governor is thus when exactly the same amount of oil is regulated as flows in past the adjusting screw 28. It is thus clear that with this governor setting, valve 10 can be closed without any pressure fluctuation in system II. In order to render this position readily recognisable, valve 10 is so constructed that it can also operate as a non-return valve when its spindle 26 is brought into the correct position. It will then prevent the FP-governor from balancing too large an oil discharge at the turbine governor by simply closing the passage when there is a reversal of the direction of flow. A drop in controlling oil pressure II or the power will thus indicate when the turbine governor is adjusted beyond its correct position. At the same moment valve 10 can be closed so that it does not open again. The various valve positions occupied during this process are shown in Figs. 7–10. During frequency-power operation the valve is open as shown in Fig. 7; oil flows in the steady state from the turbine governor to the FP-governor. When changing over to the turbine governor, valve spindle 26 must be brought into the position in Fig. 8; this should be indicated by an external mark on the valve. If remote-controlled operation is employed the auxiliary control motor 34 is automatically switched out in this position. The valve, however, remains open because the direction of flow is still unchanged. The sleeve of the turbine governor 3 with the regulating slot 32 is now slowly shifted, the controlling oil pressure in system II or the wattmeter 8 being observed continuously. As soon as the first sign of a decrease in pressure or power is noticed, this means that valve 10 has closed (Fig. 9) and can be maintained in this position (Fig. 10) either by hand or by a remote-controlled motor. The change-over process thus also comprises four phases:

(1) Adjustment of the non-return movement (Fig. 8) on valve 10.

(2) Displacement of sleeve of turbine governor until first decrease in power becomes noticeable; position Fig. 9.

(3) Valve 10 maintained in final position shown in Fig. 10.

(4) Instruments 7 and 8 disconnected and oil supply shut off by valve 25.

I claim:

1. In a regulating system for controlling the admission of motive fluid to a prime mover connected to a load; an admission valve, a fluid-pressure-operated motor device for adjusting said valve, a source of fluid pressure, and regulating means for controlling the fluid pressure at said motor device; said regulating means including a control valve in a connection between said source and said motor device, opposed fluid-pressure means tending to move said control valve in opposite directions, connections from said source to the respective fluid-pressure means, means to vary the pressure in one of said fluid-pressure means in accordance with the frequency of the prime mover, and means for varying the pressure in the other fluid-pressure means progressively in accordance with the power required to carry the load.

2. A regulating system for controlling the admission of motive fluid to a prime mover driving a generator, said regulating system of the type including a source of pressure fluid, an admission valve, fluid-pressure-operated motor means for adjusting said admission valve, a balanced control valve in a connection from the fluid pressure source to said motor means, connections from said source of pressure fluid to the opposite ends of said balanced control valve to establish forces tending to move the control valve in opposite directions, and regulating means determining the fluid pressures at the opposite end of said control valve; characterized by the fact that said regulating means includes frequency-responsive means for varying the pressure at one end of the control valve as a function of the frequency of the prime mover, and power-responsive means for progressively varying the pressure at the opposite end of the control valve as a function of the generator load.

3. A regulating system as claimed in claim 2, wherein said power-responsive means includes a valve in a connection from said source to one end of the control valve, and a power-responsive device for adjusting said last valve.

4. A regulating system as claimed in claim 2, wherein said power-responsive means includes a valve in a connection from said source to one end of the control valve, a power-responsive device for adjusting said last valve, and a direct connection from said source to the same end of the control valve in parallel with said valved connection, whereby the force established at that end of the control valve includes a constant component and a component that varies with the load.

5. A regulating system as claimed in claim 2, wherein said power-responsive means includes a valve in a connection from said source to one end of the control valve, a power-responsive device for adjusting said last valve, a direct connection from said source to the same end of the control valve in parallel with said valved connection, and an adjustable throttling valve in one of said parallel connections.

6. A regulating system as claimed in claim 2, wherein said power-responsive means includes a valve in a connection from said source to one end of the control valve, a power-responsive device for adjusting said last valve, a direct connection from said source to the same end of the control valve in parallel with said valved connection, and an adjustable throttling valve in each of said parallel connections, said throttling valves being mechanically connected for simultaneous adjustment in opposite sense.

7. A regulating system as recited in claim 2, wherei nsaid power-responsive means is a valve in a connection from said source to one end of the control valve, a power-responsive device for adjusting said valve, and a cylinder containing a spring-loaded piston in said connection between said last valve and the associated end of the cylinder.

8. A regulating system as recited in claim 2, wherein said power-responsive means is a valve in a connection from said source to one end of the control valve, a power-responsive device for adjusting said valve, a cylinder containing a spring-loaded piston in said connection between said last valve and the associated end of the cylinder, and a connection from the controlled-pressure outlet of said control valve to said cylinder at the spring side of the piston.

9. A regulating system as claimed in claim 2, wherein a combined stop-and-check valve is located in the connection from said control valve to said motor means, and said regulating means includes a by-pass connection from said source to the motor device side of said combined stop-and-check valve, and a governor for regulating the fluid pressure in said by-pass connection in accordance with the speed of the prime mover; said stop-and-check valve being adjustable from full open to full closed positions and to an intermediate position at which the check valve seats when the pressure at the outlet side of the control valve exceeds the pressure in the by-pass connection.

ALBERT LEYER.